United States Patent
Lv et al.

(10) Patent No.: US 11,367,195 B2
(45) Date of Patent: Jun. 21, 2022

(54) IMAGE SEGMENTATION METHOD, IMAGE SEGMENTATION APPARATUS, IMAGE SEGMENTATION DEVICE

(71) Applicants: Beijing BOE Optoelectronics Technology Co., Ltd., Beijing (CN); BOE Technology Group Co., Ltd., Beijing (CN)

(72) Inventors: Yaoyu Lv, Beijing (CN); Lili Chen, Beijing (CN); Hao Zhang, Beijing (CN); Fuqiang Ma, Beijing (CN); Jiankang Sun, Beijing (CN); Shuo Zhang, Beijing (CN); Gang Li, Beijing (CN); Yachong Xue, Beijing (CN); Xiangjun Peng, Beijing (CN); Chenxi Zhao, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 66 days.

(21) Appl. No.: 16/910,754

(22) Filed: Jun. 24, 2020

(65) Prior Publication Data

US 2020/0410688 A1 Dec. 31, 2020

(30) Foreign Application Priority Data

Jun. 28, 2019 (CN) .......................... 201910576833.5

(51) Int. Cl.
*G06K 9/00* (2022.01)
*G06T 7/11* (2017.01)
*G06T 7/70* (2017.01)

(52) U.S. Cl.
CPC .................. *G06T 7/11* (2017.01); *G06T 7/70* (2017.01); *G06T 2207/10016* (2013.01)

(58) Field of Classification Search
CPC ....................................................... G06T 7/11
See application file for complete search history.

(56) References Cited

U.S. PATENT DOCUMENTS 9,886,769 B1 2/2018 Tremaine et al.
10,282,844 B2 5/2019 Wang et al.
(Continued)

FOREIGN PATENT DOCUMENTS

CN 104240289 A 12/2014
CN 106203363 A 12/2016
(Continued)

OTHER PUBLICATIONS

Dec. 29, 2020—(CN) First Office Action Appn 201910576833.5 with English Translation.
(Continued)

*Primary Examiner* — Hadi Akhavannik
(74) *Attorney, Agent, or Firm* — Banner & Witcoff, Ltd.

(57) ABSTRACT

An image segmentation method, an image segmentation apparatus, an image segmentation device are provided, the image segmentation method including: extracting, from a current frame of a video image, a skeleton two-dimensional estimation and a skeleton three-dimensional estimation of a human three-dimensional skeleton; obtaining a target three-dimensional skeleton based on the skeleton two-dimensional estimation and the skeleton three-dimensional estimation; implementing image segmentation based on the target three-dimensional skeleton; wherein the human three-dimensional skeleton has multiple nodes, and the video image is a two-dimensional image, when calculating the target three-dimensional skeleton in the current frame, by comprehensively considering the skeleton two-dimensional estimation and skeleton three-dimensional skeleton estimation of the human three-dimensional skeleton in the current frame, the accuracy and robustness of the obtained target three-dimensional skeleton can be improved, thereby improving the accuracy of image segmentation.

17 Claims, 7 Drawing Sheets

(56) References Cited

U.S. PATENT DOCUMENTS

| | | | | |
|---|---|---|---|---|
| 10,902,638 | B2* | 1/2021 | Agnihotram | G06T 7/75 |
| 2008/0267471 | A1* | 10/2008 | Yu | G06K 9/4604 |
| | | | | 382/128 |
| 2018/0028837 | A1* | 2/2018 | Schaetti | A61N 5/103 |
| 2018/0225517 | A1* | 8/2018 | Holzer | G06K 9/22 |
| 2019/0171870 | A1* | 6/2019 | Vajda | G06T 7/75 |

FOREIGN PATENT DOCUMENTS

| | | |
|---|---|---|
| CN | 107103613 A | 8/2017 |
| CN | 109087329 A | 12/2018 |

OTHER PUBLICATIONS

Huanjing Yue, et al., "Body Segmentation Algorithm Based on Graph Model and Skeleton Information", Journal of Tianjin University (Natural Science and Engineering Edition), vol. 51, No. 8, pp. 838-839, Aug. 31, 2018.

Aowen Xiao, et al., "Three-Dimensional Human Pose Estimation Method Based on Convolution Neural Network", Journal of Wuhan Institute of Technology, vol. 41, No. 2, pp. 168-172, Apr. 30, 2019.

Joseph C. Tsai, et al, "3D Skeleton Construction by Multi-View 2D Images and 3D Model Segmentation", Fourth International Conference on Ubi-Media Computing, p. 168-173, Jul. 4, 2011.

Sohaib Laraba et al, "3D Skeleton-Based Action Recognition by Representing Motion Capture Sequences as 2D-RGB", Computer Animation and Virtual Worlds, vols. No. 28, p. 1-11, May 21, 2017.

* cited by examiner

100

S101: Extracting, from a current frame of a video image, a skeleton two-dimensional estimation and a skeleton three-dimensional estimation of a human three-dimensional skeleton S102: Obtaining a target three-dimensional skeleton based on the skeleton two-dimensional estimation and the skeleton three-dimensional estimation S103: Implementing image segmentation based on the target three-dimensional skeleton

Fig. 1A

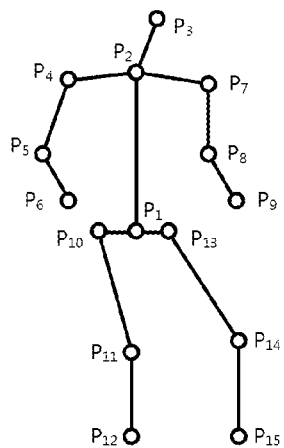

Fig. 1B

IMAGE SEGMENTATION METHOD, IMAGE SEGMENTATION APPARATUS, IMAGE SEGMENTATION DEVICE

The present disclosure claims priority to Chinese patent application with the application No. 201910576833.5, filed on Jun. 28, 2019 in China, which is incorporated by reference herein in its entirety as part of the present disclosure.

TECHNICAL FIELD

The present disclosure relates to the field of image processing, and more particularly, to an image segmentation method, an image segmentation apparatus, an image segmentation device.

BACKGROUND

As image processing is widely used in civilian and commercial fields, image segmentation has played an increasingly important role in video surveillance, virtual reality (VR) and other fields, it also faces higher demand.

In the existing image segmentation methods, the conventional image segmentation methods cannot implement automatic segmentation, the users are required to manually box-select a portrait target; the deep learning-based image segmentation methods are mostly implemented based on the two-dimensional image, the robustness of the image segmentation is poor; the image segmentation methods based on the three-dimensional skeleton require using a depth camera to acquire image depth information so as to obtain the three-dimensional skeleton, the application cost is high, the application extensiveness is narrow, and the segmentation effect is poor in outdoor conditions.

Accordingly, there is a need for an image segmentation method having high image segmentation accuracy and low application cost under the premise of implementing image segmentation.

SUMMARY

According to an aspect of the present disclosure, an image segmentation method is proposed, including: extracting, from a current frame of a video image, a skeleton two-dimensional estimation and a skeleton three-dimensional estimation of a human three-dimensional skeleton; obtaining a target three-dimensional skeleton based on the skeleton two-dimensional estimation and the skeleton three-dimensional estimation; implementing image segmentation based on the target three-dimensional skeleton; wherein the human three-dimensional skeleton has multiple nodes, and the video image is a two-dimensional image.

In some embodiments, the image segmentation method according to claim 1, wherein extracting, from a current frame of a video image, a skeleton two-dimensional estimation and a skeleton three-dimensional estimation of a human three-dimensional skeleton includes: processing the current frame of the video image through a first neural network, obtaining the skeleton two-dimensional estimation of the human three-dimensional skeleton based on a portrait in the current frame; processing a video frame group where the current frame of the video image is located through a second neural network, obtaining the skeleton three-dimensional estimation of the human three-dimensional skeleton based on the portrait in the current frame, wherein the video frame group includes a preset number of consecutive video frames; wherein the skeleton two-dimensional estimation includes two-dimensional estimation information of each node in the human three-dimensional skeleton, the skeleton three-dimensional estimation includes three-dimensional estimation information of each node in the human three-dimensional skeleton.

In some embodiments, the image segmentation method according to claim 1, wherein obtaining a target three-dimensional skeleton based on the skeleton two-dimensional estimation and the skeleton three-dimensional estimation includes: calculating an error between a preset skeleton value of the human three-dimensional skeleton and the skeleton two-dimensional estimation to obtain a first error; calculating an error between a preset skeleton value of the human three-dimensional skeleton and the skeleton three-dimensional estimation to obtain a second error; obtaining an error function based on the first error and the second error; obtaining the target three-dimensional skeleton based on the preset skeleton value of the human three-dimensional skeleton and the error function.

In some embodiments, the image segmentation method according to claim 3, wherein obtaining the target three-dimensional skeleton based on the preset skeleton value of the human three-dimensional skeleton and the error function includes: making, by adjusting three-dimensional position information of each node in the human three-dimensional skeleton, the obtained error function to have a minimum value; when the error function has the minimum value, taking the human three-dimensional skeleton at this time as the target three-dimensional skeleton.

In some embodiments, the image segmentation method according to claim 3, wherein calculating an error between a preset skeleton value of the human three-dimensional skeleton and the skeleton two-dimensional estimation to obtain a first error includes: extracting, for each node of the human three-dimensional skeleton, from predetermined three-dimensional position information of this node, its two-dimensional position information; calculating an error between the two-dimensional position information and the two-dimensional estimation information of the corresponding node in skeleton two-dimensional estimation to obtain a two-dimensional error value of each node; performing weighted average on two-dimensional error values of respective nodes to obtain the first error.

In some embodiments, the image segmentation method according to claim 3, wherein calculating an error between a preset skeleton value of the human three-dimensional skeleton and the skeleton three-dimensional estimation to obtain a second error includes: calculating an error between preset three-dimensional position information and three-dimensional estimation information of the corresponding node in skeleton three-dimensional estimation to obtain a three-dimensional error value of each node; performing weighted average on three-dimensional error values of respective nodes to obtain the second error.

According to an aspect of the present disclosure, an image segmentation apparatus is proposed, including: a skeleton estimation extracting module configured to extract, from a current frame of a video image, a skeleton two-dimensional estimation and a skeleton three-dimensional estimation of a human three-dimensional skeleton; a target three-dimensional skeleton generating module configured to obtain a target three-dimensional skeleton based on the skeleton two-dimensional estimation and the skeleton three-dimensional estimation; an image segmenting module configured to implement image segmentation based on the target three-dimensional skeleton; wherein the human three-dimensional skeleton has multiple nodes, and the video image is a two-dimensional image.

In some embodiments, the image segmentation apparatus according to claim 7, wherein the skeleton estimation extracting module includes: a skeleton two-dimensional estimation obtaining module configured to process the current frame of the video image through a first neural network, obtain the skeleton two-dimensional estimation of the human three-dimensional skeleton corresponding to a portrait in the current frame; a skeleton three-dimensional estimation obtaining module configured to process a video frame group where the current frame of the video image is located through a second neural network, obtain the skeleton three-dimensional estimation of the human three-dimensional skeleton corresponding to the portrait in the current frame, wherein the video frame group includes a preset number of consecutive video frames; wherein the skeleton two-dimensional estimation includes two-dimensional estimation information of each node in the human three-dimensional skeleton, the skeleton three-dimensional estimation includes three-dimensional estimation information of each node in the human three-dimensional skeleton.

In some embodiments, the image segmentation apparatus according to claim 7, wherein the target three-dimensional skeleton generating module includes: a first error calculating module configured to calculate an error between a preset skeleton value of the human three-dimensional skeleton and the skeleton two-dimensional estimation to obtain a first error; a second error calculating module configured to calculate an error between a preset skeleton value of the human three-dimensional skeleton and the skeleton three-dimensional estimation to obtain a second error; an error function determining module configured to obtain an error function based on the first error and the second error; a target three-dimensional skeleton calculating module configured to obtain the target three-dimensional skeleton based on the preset skeleton value of the human three-dimensional skeleton and the error function.

In some embodiments, the image segmentation apparatus according to claim 9, wherein the target three-dimensional skeleton calculating module includes: an error function minimum calculating module configured to make, by adjusting three-dimensional position information of each node in the human three-dimensional skeleton, the obtained error function to have a minimum value; a target three-dimensional skeleton obtaining module configured to take, when the error function has the minimum value, the human three-dimensional skeleton at this time as the target three-dimensional skeleton.

In some embodiments, the image segmentation apparatus according to claim 9, wherein the first error calculating module includes: a node two-dimensional position information extracting module configured to extract, from each node of the human three-dimensional skeleton, from predetermined three-dimensional position information of this node, its two-dimensional position information; a node two-dimensional error calculating module configured to calculate an error between the two-dimensional position information and two-dimensional estimation information of the corresponding node in the skeleton two-dimensional estimation to obtain a two-dimensional error value of each node; a first error determining module configured to perform weighted average on two-dimensional error values of respective nodes to obtain the first error.

In some embodiments, the image segmentation apparatus according to claim 9, wherein the second error calculating module includes: a node three-dimensional error calculating module configured to calculate an error between preset three-dimensional position information and three-dimensional estimation information of the corresponding node in skeleton three-dimensional estimation to obtain a three-dimensional error value of each node; a second error determining module configured to perform weighted average on the three-dimensional error values of respective nodes to obtain the second error.

According to an aspect of the present disclosure, an image segmentation device is proposed, wherein the device includes a processor and a memory, the memory includes a set of instructions that, when executed by the processor, cause the image segmentation device to perform operations including: extracting, from a current frame of a video image, a skeleton two-dimensional estimation and a skeleton three-dimensional estimation of a human three-dimensional skeleton; obtaining a target three-dimensional skeleton based on the skeleton two-dimensional estimation and the skeleton three-dimensional estimation; implementing image segmentation based on the target three-dimensional skeleton; wherein the human three-dimensional skeleton has multiple nodes, and the video image is a two-dimensional image.

In some embodiments, the image segmentation device according to claim 13, wherein obtaining a target three-dimensional skeleton based on the skeleton two-dimensional estimation and the skeleton three-dimensional estimation includes: calculating an error between a preset skeleton value of the human three-dimensional skeleton and the skeleton two-dimensional estimation to obtain a first error; calculating an error between a preset skeleton value of the human three-dimensional skeleton and the skeleton three-dimensional estimation to obtain a second error; obtaining an error function based on the first error and the second error; obtaining the target three-dimensional skeleton based on the preset skeleton value of the human three-dimensional skeleton and the error function.

According to an aspect of the present disclosure, a computer-readable storage medium is proposed, characterized in that computer-readable instructions are stored thereon, and when the instructions are executed by a computer, the method described above is performed.

BRIEF DESCRIPTION OF THE DRAWINGS

In order to more clearly illustrate the technical solutions of the embodiments of the present disclosure, hereinafter, the drawings necessary for illustration of the embodiments of the present disclosure will be introduced briefly, the drawings described below are obviously only some embodiments of the present disclosure, it is possible for a person of ordinary skill in the art to obtain other drawings based on these drawings without paying creative efforts. The following drawings are focused on showing the gist of the present disclosure, not schematically scaled by actual dimensions.

FIG. 1A shows an exemplary flowchart of an image segmentation method according to an embodiment of the present disclosure;

FIG. 1B shows a schematic diagram of a human three-dimensional skeleton according to an embodiment of the present disclosure;

DETAILED DESCRIPTION OF THE EMBODIMENTS

Figure 2A:
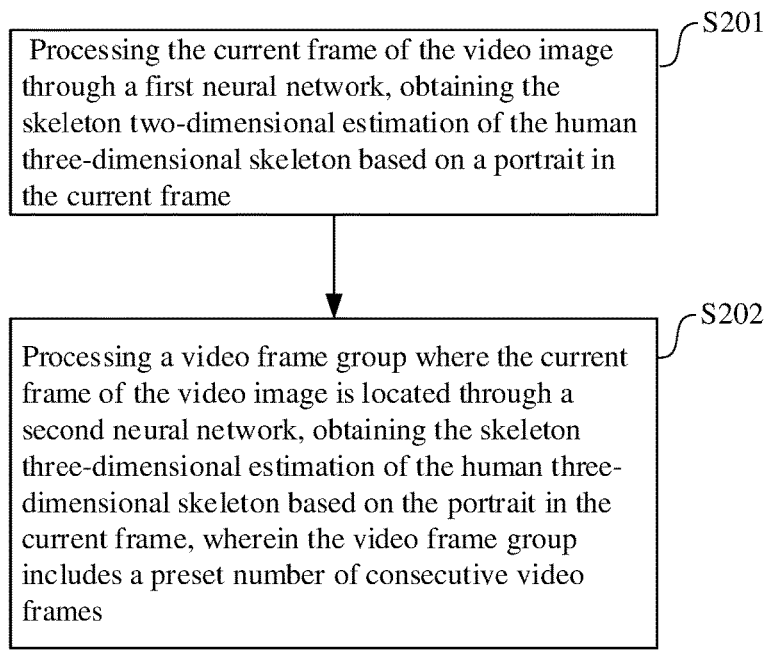
FIG. 2A shows an exemplary flowchart of extracting a skeleton two-dimensional estimation and a skeleton three-dimensional estimation of a human three-dimensional skeleton for a current frame of a video image according to an embodiment of the present disclosure.

Hereinafter, the technical solutions in the embodiments of the present disclosure will be described in a clear and complete way with reference to the accompanying drawings. Obviously, these described embodiments are merely parts of the embodiments of the present disclosure, rather than all of the embodiments thereof. Other embodiments obtained by a person of ordinary skill in the art based on the embodiments of the present disclosure without paying creative effort all fall into the protection scope of the present disclosure.

As illustrated in the present disclosure and the claims, the words "a", "an" and/or "the" do not specifically refer to the singular form, but may include the plural form, unless the context clearly indicates otherwise. Generally, the terms "include" and "comprise" are intended to include only the steps and elements that are specified, but these steps and elements do not constitute an exclusive list, and the method or device may also include other steps or elements.

Although the present disclosure makes various references to certain modules in the system in accordance with the embodiments of the present disclosure, any number of different modules can be used and executed on a user terminal and/or a server. The modules are merely illustrative, and different aspects of the systems and methods may use different modules.

Flowcharts are used in the present disclosure to illustrate operations executed by the system in accordance with the embodiments of the present disclosure. It should be understood that the preceding or subsequent steps are not necessarily performed in the precise order. Instead, the respective steps may be processed in the reverse order or simultaneously as needed. Also, other operations may be added to these procedures, or one or more steps may be removed from these procedures.

FIG. 1A shows an exemplary flowchart of an image segmentation method 100 according to an embodiment of the present disclosure.

First, in step S101, a skeleton two-dimensional estimation and a skeleton three-dimensional estimation of a human three-dimensional skeleton are extracted from a current frame of a video image.

The video image may be an image captured in real time through a camera or a video recording device, or may also be a video image obtained in advance in other ways. The embodiments of the present disclosure are not limited by the sources and obtaining methods of the video image. For example, it may be an image directly taken by a road camera, a surveillance camera of an unmanned supermarket, or the like, or it may also be a video image obtained after pre-processing by a computer.

The current frame of the video image is an image frame of the video image to be analyzed at the current time, which may be, for example, an image frame captured in real time at the current time.

The human three-dimensional skeleton refers to a human skeleton model constructed based on human three-dimensional structural features, it has multiple nodes. FIG. 1B shows a schematic diagram of a human three-dimensional skeleton according to an embodiment of the present disclosure. As shown in FIG. 1B, the human three-dimensional skeleton may, for example, include multiple nodes and connection relationships between the respective nodes. When constructing the human three-dimensional skeleton, for example, a root node may be first constructed, such as the root node P1 in FIG. 1B, thereafter corresponding child nodes are brought for each root node, as shown by the node P13, P14 in FIG. 1B, the set human three-dimensional skeleton may include, for example, fifteen nodes, or it may include more or fewer nodes, e.g. including ten nodes or twenty-five nodes, based on complexity of body movement in the image and precision requirement of image processing. The embodiments of the present disclosure are not limited by the number of the nodes included in the constructed human three-dimensional skeleton and the connection relationships between the respective nodes.

Based on portrait features of the portrait in each frame, the human three-dimensional skeleton may have different spatial position conformations accordingly, that is, the human three-dimensional skeleton may have different skeleton poses. Based on this, the human three-dimensional skeleton may have different position values for different frames of the video image, that is, the respective nodes in the human three-dimensional skeleton may have different three-dimensional position information. The present disclosure is not limited by the specific spatial position conformation that the human three-dimensional skeleton has in different video image frames.

In some embodiments, a preset spatial position conformation may be set for the human three-dimensional skeleton, that is, a preset skeleton value of the human three-dimensional skeleton is set in advance. The human three-dimensional skeleton may have the same preset skeleton value in all frames of the video image, for example, preset three-dimensional position information is set in advance for each node in the human three-dimensional skeleton, and the preset three-dimensional position information is used for each frame of the video image; or, the preset skeleton value of the human three-dimensional skeleton may change based on the video frame, for example, for each frame of the video image, the three-dimensional position information owned by each node of the human three-dimensional skeleton in the previous frame may be set as the preset position information of each node of the human three-dimensional skeleton in the frame. The embodiments of the present disclosure are not limited by the specific setting method of the preset skeleton value and the numeric thereof.

For example, the three-dimensional position information of the node may be, for example, an absolute position of the node relative to a preset coordinate axis, for example, a rectangular coordinate system is established with a reference point (such as the point where the camera lens is located) as the origin, a position coordinate of each node along the horizontal axis, the vertical axis and the depth axis of the coordinate system are used as the position information, or node three-dimensional position information of each node in the three-dimensional human skeleton may also be represented by other methods. The embodiments of the present disclosure are not limited by the specific representation manner of the three-dimensional position information of the nodes in the human three-dimensional skeleton.

Said extracting a skeleton two-dimensional estimation of a human three-dimensional skeleton means that, from the current frame of the video image, a position information estimated value of each node of the human three-dimensional skeleton in the two-dimensional space is obtained based on portrait features in the current frame.

Said extracting a skeleton three-dimensional estimation of a human three-dimensional skeleton means that, for the current frame of the video image, a position information estimated value of each node of the human three-dimensional skeleton in the three-dimensional space is obtained based on portrait features in the current frame.

Thereafter, in step S102, a target three-dimensional skeleton is obtained based on the skeleton two-dimensional estimation and the skeleton three-dimensional estimation.

The target three-dimensional skeleton represents a three-dimensional human skeleton with a specific spatial position conformation and corresponding to features of the portrait in each frame of the video image. For example, for each frame of the video image, position information possessed by each node of the human three-dimensional skeleton in the video frame can be determined based on features of the portrait therein, thereby the target three-dimensional skeleton in the video frame is obtained.

For example, if there is only a single portrait in the video image, the target three-dimensional skeleton corresponding thereto can be obtained based on the portrait; if there are multiple portraits in the video image, each of the multiple portraits can be processed, finally, the corresponding target three-dimensional skeleton is contained for each of the multiple portraits. The embodiments of the present disclosure are not limited by the number of portraits in the video image and the number of target three-dimensional skeletons obtained in each video frame.

In some embodiments, the process of obtaining a target three-dimensional skeleton through the skeleton two-dimensional estimation and the skeleton three-dimensional estimation may be, for example: adjusting the skeleton three-dimensional estimation based on the skeleton two-dimensional estimation to obtain the target three-dimensional skeleton; or, comparing preset space conformation of the three-dimensional human skeleton with the skeleton two-dimensional estimation, the skeleton three-dimensional estimation, and adjusting preset position information of each node in the human three-dimensional skeleton based on the comparison result to obtain the target three-dimensional skeleton. The embodiments of the present disclosure are not limited by the specific method of obtaining a target three-dimensional skeleton based on the skeleton two-dimensional estimation and the skeleton three-dimensional estimation.

After obtaining the target three-dimensional skeleton, in step S103, image segmentation is implemented based on the target three-dimensional skeleton.

The process of implementing image segmentation based on the target three-dimensional skeleton, for example, can input the target three-dimensional skeleton to an input end of an image segmentation algorithm, for example, inputting it to the input end of the GrabCut algorithm, so as to initialize the image segmentation algorithm by using the target three-dimensional skeleton, thereafter, the image segmentation process is performed by the initialized image segmentation algorithm. The present disclosure is not limited by the specific process of implementing image segmentation based on the target three-dimensional skeleton and the selected specific segmentation algorithm.

The video image is a two-dimensional image, that is, an image that does not contain depth information. The two-dimensional image may be directly acquired by a monocular camera, or it may also be a two-dimensional image acquired by other methods. The embodiments of the present disclosure are not limited by the source and obtaining manner of the two-dimensional image.

Based on the above, the image segmentation method described in the present disclosure calculates the target three-dimensional skeleton in the current frame by comprehensively considering skeleton two-dimensional estimation and skeleton three-dimensional estimation of the human three-dimensional skeleton in the current frame, and implements image segmentation based on the target three-dimensional skeleton, enables to improve accuracy and robustness of the obtained target three-dimensional skeleton, thereby accuracy of image segmentation is improved; in addition, the present disclosure implements three-dimensional skeleton construction based on the two-dimensional video image acquired by the monocular camera, the present application has a lower cost of use compared with constructing the three-dimensional skeleton based on the three-dimensional image acquired by a depth camera.

FIG. 2A shows an exemplary flowchart of extracting a skeleton two-dimensional estimation and a skeleton three-dimensional estimation of a human three-dimensional skeleton for a current frame of a video image according to an embodiment of the present disclosure.

Referring to FIG. 2A, in some embodiments, extracting, from a current frame of a video image, a skeleton two-dimensional estimation and a skeleton three-dimensional estimation of a human three-dimensional skeleton comprises: first, in step S201, the current frame of the video image is processed through a first neural network, the skeleton two-dimensional estimation of the human three-dimensional skeleton is obtained based on a portrait in the current frame.

The first neural network may be selected based on actual needs, for example, it may be a fast area-based convolutional neural network (Fast R-CNN), a mask area-based convolutional neural network (Mask R-CNN), or it may be achieved by a compound neural network formed by integrating it with a fully connected network or other integrated processing network architecture. Herein, no limitation is made on the type of the selected first neural network.

Based on the selected first neural network, it can be further trained based on a preset sample set, for example, the first neural network is trained through a preset offline two-dimensional database MPII Human Pose, and the trained neural network is saved to realize the extraction of the two-dimensional skeleton estimation. The present disclosure is not limited by the training manner of the first neural network.

Figure 2B:
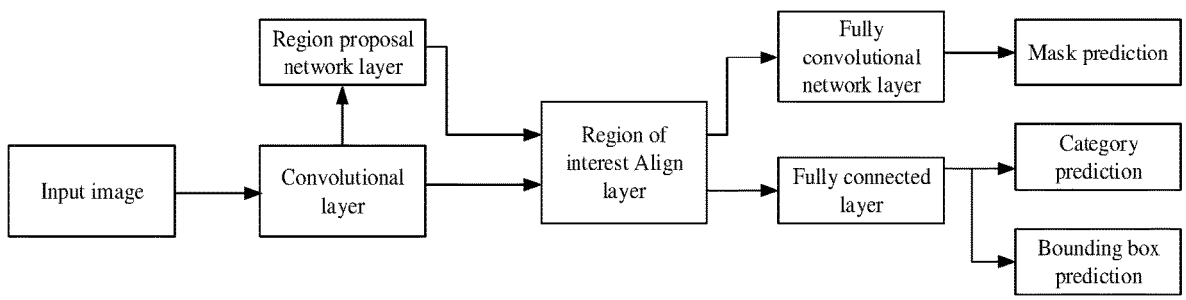
FIG. 2B shows a schematic structural diagram of a first neural network according to an embodiment of the present disclosure.

FIG. 2B shows a schematic structural diagram of a first neural network according to an embodiment of the present disclosure, wherein the first neural network is, for example, the Mask R-CNN network.

Referring to FIG. 2B, the above process can be described in more detail. First, the current frame of the video image is inputted in the input layer of the Mask R-CNN network, then the current image is processed through the convolutional layer to extract features of the current image, the features are shared by the subsequent region proposal network layer (RPN) and fully connected layer; next, in the region proposal network layer, a set of target anchor points is obtained based on the image features, and the target anchor points are further determined to belong to foreground or background and rectified, a candidate region is obtained finally; the candidate region is inputted to the Region of interest Align layer (RoIAlign) to adjust with respect to a position deviation problem of the candidate region due to quantization in the process of forming the candidate region; a result of the processing by the Region of interest Align layer is transmitted to the convolutional network layer and the fully connected layer, a mask prediction of the target is obtained through processing by the convolutional network layer; a target category and a bounding box prediction are obtained through processing by the fully connected layer; finally, the skeleton two-dimensional estimation of the human three-dimensional skeleton based on the portrait in the current frame is obtained at the output end based on the mask prediction, the target category and the bounding box prediction.

The skeleton two-dimensional estimation includes two-dimensional estimation information of each node in the human three-dimensional skeleton. The two-dimensional estimation information may be, for example, represented as a two-dimensional coordinate position of the node in the two-dimensional image. For example, for a two-dimensional image with a rectangular shape, its lower left corner may be used as an origin of coordinates, the X axis is constructed along its horizontal direction, and the positive direction of the X axis is assumed to be the direction pointing to the lower right corner of the two-dimensional image, the Y axis is constructed along its vertical direction, the positive direction of the Y axis is assumed to be the direction pointing to the upper left corner of the two-dimensional image. The position coordinate of each node is obtained based on the constructed coordinate axis, and used as the two-dimensional estimation information of the node. The embodiments of the present disclosure are not limited by the manner in which the two-dimensional estimation information of each node is represented.

In step S202, a video frame group where the current frame of the video image is located is processed through a second neural network, the skeleton three-dimensional estimation of the human three-dimensional skeleton is obtained based on the portrait in the current frame.

The video frame group includes a preset number of consecutive video frames. It aims to provide human motion information in the video image, therefore, it can be set based on actual needs or a time interval between adjacent frames of the video image. For example, fifty consecutive video frames may be set as a group, or eighty consecutive video frames may be set as a group. The embodiments of the present disclosure are not limited by the specific number of video frames included in the video frame group.

In some embodiments, when calculating the skeleton three-dimensional estimation, for example, multiple consecutive video frames in the video image may be first inputted to the input end of the second neural network, that is, the video frame group in the video image is inputted to the input end of the second neural network, the video frame group is processed by the second neural network based on time stream features to obtain the human motion information in the video frame group, and further, the skeleton three-dimensional estimation of the human three-dimensional skeleton is obtained through comprehensive synthesis based on the human motion information and the two-dimensional image information; or the skeleton three-dimensional estimation can also be obtained by other manners. The embodiments of the present disclosure are not limited by the specific manner in which the second neural network calculates the skeleton three-dimensional estimation of the human three-dimensional skeleton in the video image.

The second neural network may be selected based on actual needs, for example, it may be a fast area-based convolutional neural network (Fast R-CNN), a mask area-based convolutional neural network (Mask R-CNN), or it may be achieved by a compound neural network formed by integrating it with a fully connected network or other integrated processing network architecture. Herein, no limitation is made on the type of the selected second neural network.

Based on the selected second neural network, it can be further trained based on a preset sample set, for example, the second neural network is trained through a preset three-dimensional database Human 3.6M or MPI-INF-3DHP, and the trained neural network is saved to realize the extraction of the three-dimensional skeleton estimation. The present disclosure is not limited by the training manner of the second neural network.

The skeleton three-dimensional estimation includes three-dimensional estimation information of each node in the human three-dimensional skeleton. The three-dimensional estimation information may be represented as a three-dimensional coordinate position of the node, for example, the position coordinate of the node on the horizontal axis, the vertical axis, and the depth axis relative to a preset coordinate origin (such as the camera lens) is used as the position information. The embodiments of the present disclosure are not limited by the manner in which the three-dimensional estimation information of each node is represented.

It should be understood that the operations of steps S201 and S201 may be performed in parallel, or performed sequentially, no limitation is made herein. Further, as required, steps S202 and S203 may be performed based on different video images obtained after pre-processing, as long as these video images are from the same original video image.

Based on the above, the current frame of the video image is processed through the first neural network to obtain the skeleton two-dimensional estimation of the human three-dimensional skeleton in the current frame; and the video frame group is processed through the second neural network to obtain the skeleton three-dimensional estimation of the human three-dimensional skeleton based on the two-dimensional video image, which is beneficial to the subsequent calculation of the target skeleton based on the skeleton two-dimensional estimation and the skeleton three-dimensional estimation. At the same time, the motion information of the portrait in the video image is obtained by processing the consecutive video frames, the skeleton three-dimensional estimation is obtained based on the two-dimensional image, so that the method can be implemented with only a monocular camera, it has a lower application cost.

Figure 3:
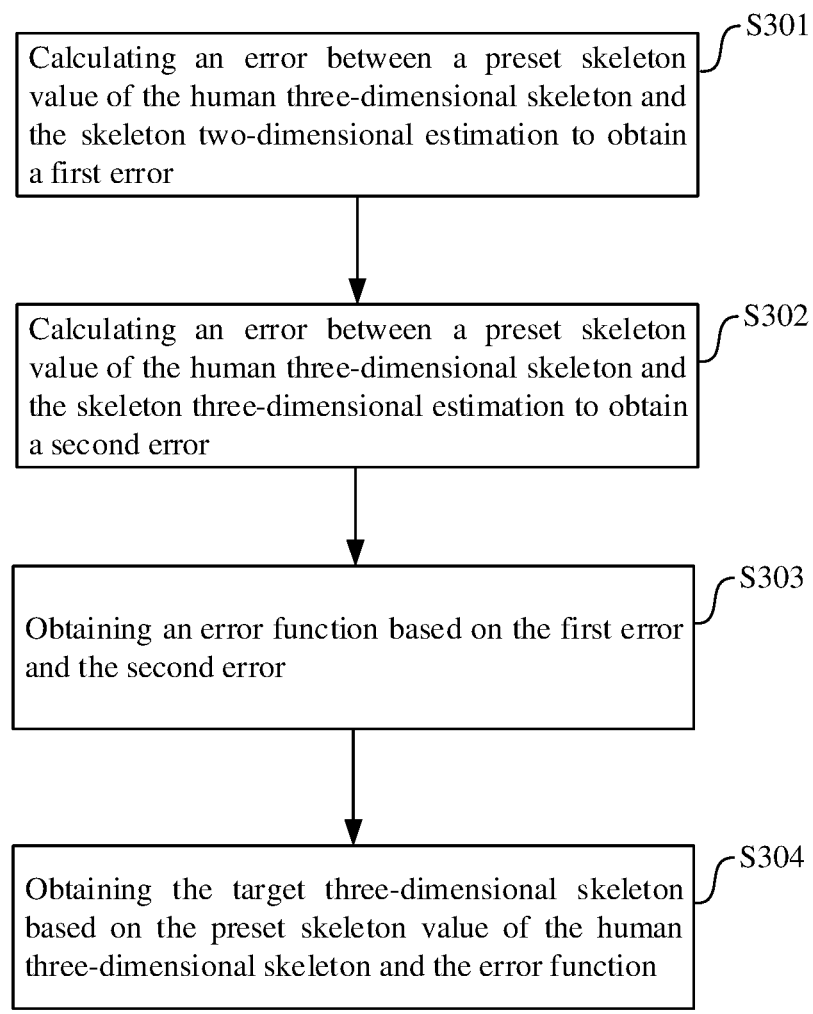
FIG. 3 shows an exemplary flowchart of obtaining a target three-dimensional skeleton based on the skeleton two-dimensional estimation and the skeleton three-dimensional estimation according to an embodiment of the present disclosure.

FIG. 3 shows an exemplary flowchart of obtaining a target three-dimensional skeleton based on the skeleton two-dimensional estimation and the skeleton three-dimensional estimation according to an embodiment of the present disclosure.

Referring to FIG. 3, in some embodiments, in order to obtain the target three-dimensional skeleton, first, in step S301, an error between a preset skeleton value of the human three-dimensional skeleton and the skeleton two-dimensional estimation is calculated to obtain a first error.

As described above, the human three-dimensional skeleton may have the same preset skeleton value in all frames of the video image, or the preset skeleton value of the human three-dimensional skeleton may vary based on different video frames of the video image. The embodiments of the present disclosure are not limited by the specific value of the preset skeleton value.

In some embodiments, during the process of calculating the first error, for example, the three-dimensional position information of each node may be first converted into its position information in the two-dimensional image, then the error calculation is performed. Or, the comparison between the human three-dimensional skeleton and the skeleton two-dimensional estimation can be achieved by other methods. The embodiments of the present disclosure are not limited by the comparison method selected for the human three-dimensional skeleton and the skeleton two-dimensional estimation.

Further, in step S302, an error between a preset skeleton value of the human three-dimensional skeleton and the skeleton three-dimensional estimation is calculated to obtain a second error.

In some embodiments, when calculating the error between the human three-dimensional skeleton and the skeleton three-dimensional estimation, for example, preset position information of each node may be directly compared with its three-dimensional estimation information, or the coordinate system can be converted first for it, for example, comparison is made after they are all converted to the reference coordinate system. The embodiments of the present disclosure are not limited by the comparison method selected for the comparison between the human three-dimensional skeleton and the skeleton three-dimensional estimation.

For example, the above process of calculating the first error and the second error may be performed for each node in the human three-dimensional skeleton, that is, for each node, its three-dimensional position information is compared with the estimation information in the skeleton two-dimensional estimation and the skeleton three-dimensional estimation; it is also possible to perform comparison only on pre-selected preset nodes, for example, only the root nodes in the human three-dimensional skeleton are compared; it is also possible to divide each node in the human three-dimensional skeleton into different node groups and then comparison is made based on the node groups. The present disclosure is not limited by the number of nodes used to calculate the first error and the second error in the human three-dimensional skeleton.

It should be understood that the operations of steps S301 and S302 may be performed in parallel, or performed sequentially, no limitation is made herein.

The first error and the second error in the present disclosure are only used to distinguish the errors that the human three-dimensional skeleton has with respect to the two-dimensional error estimation and the skeleton three-dimensional estimation, not used to limit the error.

After obtaining the first error and the second error, in step S303, an error function is obtained based on the first error and the second error.

The error function may be, for example, directly adding the comparison results obtained by comparing the human three-dimensional skeleton with the skeleton two-dimensional estimation and the skeleton three-dimensional estimation, or may be inputting the comparison results to the selected algorithm or formula for further processing to obtain the error function. The embodiments of the present disclosure are not limited by the specific composition manner of the error function.

The process of obtaining an error function based on the first error and the second error may be, for example, for each frame of the video image, obtaining an error function corresponding to the video frame based on the first error and the second error obtained for the frame; or it may also be an error function corresponding to the video frame group, that is, based on a preset video frame group, the first error and the second error of multiple video frames belonging to the video frame group are added to obtain the error function corresponding to the video frame group. The embodiments of the present disclosure are not limited by the specific composition of the obtained error function.

In some embodiments, for example, the error function may be obtained by performing weighted average on the first error and the second error corresponding to the current frame of the video image, weights of the first error and the second error may be set based on actual needs and accuracy requirements. The present disclosure is not limited by the weight values set for the first error and the second error.

For example, in some embodiments, the error function may be calculated by directly adding the first error and the second error corresponding to the current frame, and the error function may be represented by the following formula:

$$S_f = E_{2d}(f) + E_{3d}(f) \tag{1}$$

wherein $S_f$ represents the error function corresponding to the f-th frame of the video image, $E_{2d}(f)$ represents the first error corresponding to the f-th frame of the video image, $E_{3d}(f)$ represents the second error corresponding to the f-th frame of the video image, f is a positive integer greater than or equal to one and less than or equal to the total number of frames that the video image has.

In some embodiments, for example, the first error of the video frame group may be obtained by performing weighted average on the first error corresponding to the respective video frame in the video frame group of the video image, the second error of the video frame group may be obtained by performing weighted average on the second error corresponding to the respective video frame in the video frame group of the video image, and the first error and the second error of the video frame group are added to obtain an error function corresponding to the video frame group.

For example, when the first error of the video frame group is calculated by performing weighted average on the first error corresponding to the respective video frame in the video frame group of the video image, different weight values may be assigned to different video frames in the video frame group based on accuracy requirements, for example, a higher weight value may be assigned to the first error corresponding to the current frame in the video frame group, and a lower weight may be assigned to the first error corresponding to other video frames in the video frame group except the current frame, such as assigning a weight value 1 to the first error of the current frame and a weight value 0.4 to the first error of other video frames in the video frame group; the same weight value may also be assigned to the first error corresponding to the respective video frame in the video frame group. The embodiments of the present disclosure are not limited by the weight value assigned to the first error corresponding to the respective video frame in the video frame group when calculating the first error of the video frame group.

For example, when the second error of the video frame group is calculated by performing weighted average on the second error corresponding to the respective video frame in the video frame group of the video image, different weight values may be assigned to different video frames in the video frame group based on accuracy requirements, for example, a higher weight value may be assigned to the second error corresponding to the current frame in the video frame group, and a lower weight may be assigned to the second error corresponding to other video frames in the video frame group except the current frame, such as assigning a weight value 1 to the second error of the current frame and a weight value 0.4 to the second error of other video frames in the video frame group; the same weight value may also be assigned to the second error corresponding to the respective video frame in the video frame group. The embodiments of the present disclosure are not limited by the weight value assigned to the second error corresponding to the respective video frame in the video frame group when calculating the second error of the video frame group.

For example, when the same weight value is assigned to all video frames in a video frame group, the process of calculating the error function of the video frame group based on the first error of the video frame group and the second error of the video frame group may be represented by the following formula:

$$S_G = \frac{1}{m}\sum_{f=f_0}^{f_m} E_{2d}(f) + \frac{1}{m}\sum_{f=f_0}^{f_m} E_{3d}(f) \quad (2)$$

wherein $S_G$ represents an error function corresponding to the G-th video frame group of the video image, the G-th video frame group has m video frames, m is a positive integer greater than or equal to one; the initial frame of the video frame group is $f_0$, the end frame thereof is $f_m$, the initial frame $f_0$ and the end frame $f_m$ are both positive integers greater than or equal to one and less than or equal to the total number of frames of the video image, and the initial frame $f_0$ is less than the end frame $f_m$; $E_{2d}(f)$ represents the first error corresponding to the f-th frame of the video image, $E_{3d}(f)$ represents the second error corresponding to the f-th frame of the video image, f is a positive integer greater than or equal to initial frame $f_0$ and less than or equal to the end frame $f_m$.

Thereafter, in step S304, the target three-dimensional skeleton is obtained based on the preset skeleton value of the human three-dimensional skeleton and the error function.

The process of obtaining the target three-dimensional skeleton based on the preset skeleton value of the human three-dimensional skeleton and the error function can, for example, by adjusting the preset skeleton value of the human three-dimensional skeleton, make the error function to take a minimum value, when the error function obtains the minimum value, the human three-dimensional skeleton at this time is taken as the target three-dimensional skeleton; or the target three-dimensional skeleton may also be obtained in other ways. The embodiments of the present disclosure are not limited by the specific manner in which the target three-dimensional skeleton is obtained based on the preset skeleton value of the human three-dimensional skeleton and the error function.

Based on the above, by calculating the first error existing between the human three-dimensional skeleton and the two-dimensional skeleton estimation, calculating the second error existing between the human three-dimensional skeleton and the skeleton three-dimensional estimation, the error function is constructed comprehensively based on the first error and the second error, further the target three-dimensional skeleton in the current frame is obtained based on the error function, so that the obtained target three-dimensional skeleton has higher accuracy and robustness, which is beneficial to improve accuracy of the subsequent image segmentation.

Figure 4:
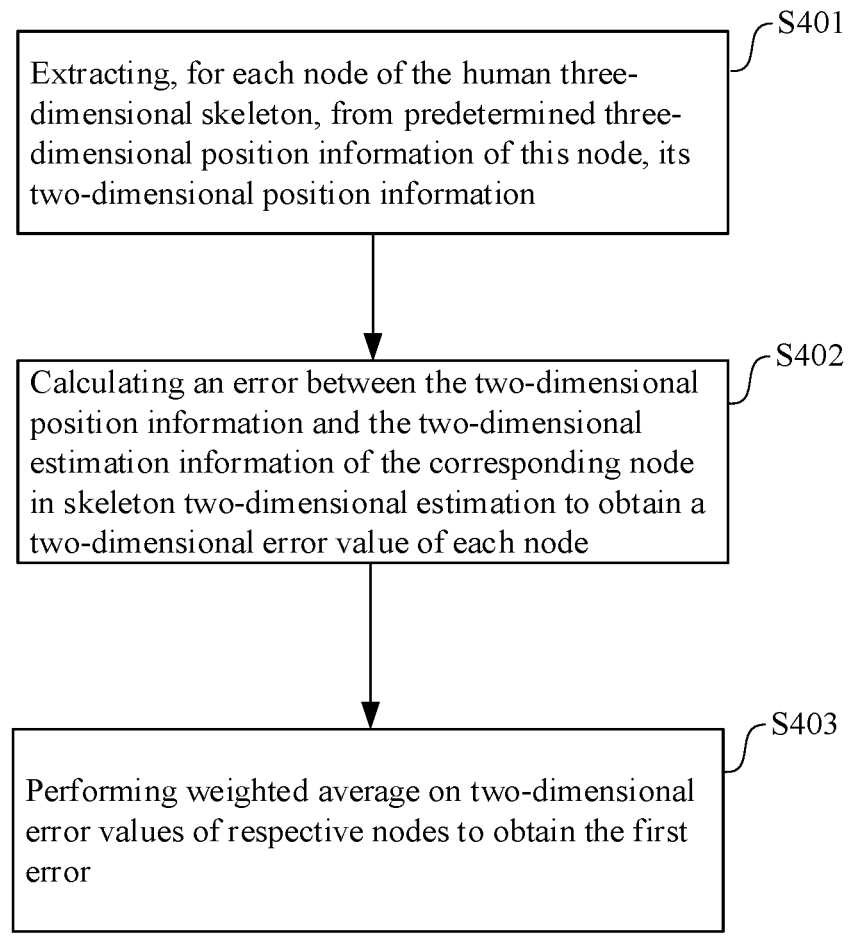
FIG. 4 shows an exemplary flowchart of calculating an error between a preset skeleton value of the human three-dimensional skeleton and the skeleton two-dimensional estimation to obtain a first error according to an embodiment of the present disclosure.

FIG. 4 shows an exemplary flowchart of calculating an error between a preset skeleton value of the human three-dimensional skeleton and the skeleton two-dimensional estimation to obtain a first error according to an embodiment of the present disclosure.

Referring to FIG. 4, in some embodiments, the process of calculating the error between the preset skeleton value of the human three-dimensional skeleton and the skeleton three-dimensional estimation to obtain the second error can be described in more detail. First, in step S401, for each node of the human three-dimensional skeleton, its two-dimensional position information is extracted from predetermined three-dimensional position information of this node.

The process of extracting the two-dimensional position information of the node based on the preset three-dimensional position information may, for example, by re-projecting the node to a two-dimensional image plane to convert the three-dimensional position information of the node to the two-dimensional position information, its two-dimensional position information is obtained based on its position on the two-dimensional plane after re-projection; or coordinates of the horizontal axis and the vertical axis in its three-dimensional position information may be directly used as its two-dimensional position information. The embodiments of the present disclosure are not limited by the specific method of obtaining the two-dimensional position information of the node.

After obtaining the two-dimensional position information of the node, in step S402, an error between the two-dimensional position information and two-dimensional estimation information of the corresponding node in the skeleton two-dimensional estimation is calculated to obtain a two-dimensional error value of each node.

In some embodiments, when calculating the two-dimensional error value of each node, for example, a plane distance between the two-dimensional coordinate information of the node and its two-dimensional estimated position information in the two-dimensional plane may be obtained, and the square of the plane distance value may be used as the two-dimensional error value of the node, or the plane distance may be directly used as the error value. The embodiments of the present disclosure are not limited by the specific type of the two-dimensional error value.

After obtaining the two-dimensional error value of each node, in step S403, weighted average is performed on two-dimensional error values of respective nodes to obtain the first error.

For example, in the process of performing weighted average on the two-dimensional error values of respective nodes, the weight assigned to the respective nodes may be the same, for example, the current human three-dimensional skeleton has ten nodes, a weight value 0.1 is assigned to each node, or a different weight value may be assigned to a different node, for example, a higher weight value is assigned to the root node, and a lower weight value is assigned to the child node. The embodiments of the present disclosure are not limited by the specific numeric of the set weight value.

The process of obtaining the first error described above can be described in more detail. For example, when the same weight value is assigned to each node, the first error can be obtained based on the human three-dimensional skeleton and the skeleton two-dimensional estimation for the current frame of the video image:

$$E_{2d} = \frac{1}{N} \sum_{i=1}^{N} |proj(J_i) - D_i^{2d}|^2 \quad (3)$$

wherein $E_{2d}$ represents the error between the human three-dimensional skeleton and the skeleton two-dimensional estimation in the current frame of the video image, that is, the first error; J represents the human three-dimensional skeleton in the current frame, the skeleton has N nodes, N is a positive integer greater than or equal to one; $D^{2d}$ represents the skeleton two-dimensional estimation in the current frame, which accordingly includes the two-dimensional estimation information of N nodes; and wherein $J_i$ represents the preset position information of the i-th node in the human three-dimensional skeleton, $D_i^{2d}$ represents the two-dimensional estimation information of the i-th node in the skeleton two-dimensional estimation, i is a positive integer greater than or equal to one and less than or equal to N; proj represents the process of re-projection, and "| . . . |" represents the process of calculating the plane distance.

Based on the above, for each node in the human three-dimensional skeleton, the two-dimensional error of the node is calculated relative to the skeleton two-dimensional estimation of the node, and two-dimensional errors of all nodes are weighted to obtain the first error, so that the first error can comprehensively reflect the difference between the preset position information of the respective node in the human three-dimensional skeleton and the corresponding skeleton two-dimensional estimation information, which is beneficial to subsequent construction of the error function.

Figure 5:
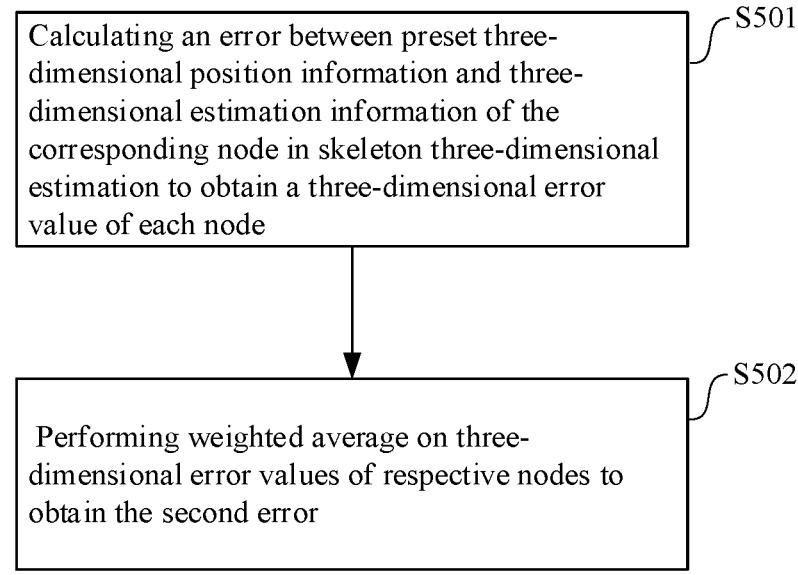
FIG. 5 shows an exemplary flowchart of calculating an error between a preset skeleton value of the human three-dimensional skeleton and the skeleton three-dimensional estimation to obtain a second error according to an embodiment of the present disclosure.

FIG. 5 shows an exemplary flowchart of calculating an error between a preset skeleton value of the human three-dimensional skeleton and the skeleton three-dimensional estimation to obtain a second error according to an embodiment of the present disclosure.

Referring to FIG. 5, in some embodiments, the process of calculating the error between the preset skeleton value of the human three-dimensional skeleton and the skeleton three-dimensional estimation to obtain the second error can be described in more detail. First, in step S501, for each node in the human three-dimensional skeleton, an error between preset three-dimensional position information and three-dimensional estimation information of the corresponding node in skeleton three-dimensional estimation is calculated to obtain a three-dimensional error value of each node.

For example, at the time of calculating the three-dimensional error value of each node, when the position information of each node in the human three-dimensional skeleton is its position coordinate in the reference coordinate system (e.g., the coordinate system constructed by using the camera lens as the origin), the position information of each root node in the skeleton three-dimensional estimation is its coordinate in the reference coordinate system, and the position information of each child node is its relative coordinate position in the relative coordinate system (e.g., the relative coordinate system constructed by using the root node as the origin), coordinate system conversion may be first performed on each child node in the three-dimensional skeleton estimation to convert from the relative coordinate position in the relative coordinate system to the coordinate position in the reference coordinate system, so that the human three-dimensional skeleton and the position information in the three-dimensional skeleton estimation both are position information relative to the same coordinate system, then the two are compared. The embodiments of the present disclosure are not limited by the specific method of obtaining the three-dimensional error value of the node.

For example, when calculating the three-dimensional error value of each node, the spatial distance between the two-dimensional coordinate information of the node and its three-dimensional estimated position information can be calculated, and the square of the spatial distance value can be used as the three-dimensional error value of the node, or the spatial distance may be directly used as the error value. The embodiments of the present disclosure are not limited by the specific type of the three-dimensional error value.

After calculating the three-dimensional error value of each node, in step S502, weighted average is performed on three-dimensional error values of respective nodes to obtain the second error.

For example, in the process of performing weighted average on the three-dimensional error values of respective nodes, the weight assigned to the respective nodes may be the same, for example, the current human three-dimensional skeleton has ten nodes, a weight value 0.1 is assigned to the three-dimensional error value of each node, or a different weight value may be assigned to the three-dimensional error value of a different node, for example, a higher weight value is assigned to the three-dimensional error value of the root node, and a lower weight value is assigned to the three-dimensional error value of the child node. The embodiments of the present disclosure are not limited by the specific numeric of the set weight value.

The process of obtaining the second error described above can be described in more detail. In some embodiments, for the current frame of the video image, the second error can be obtained based on the human three-dimensional skeleton and the skeleton three-dimensional estimation through, for example, the following formula:

$$E_{3d} = \frac{w_f}{N} \sum_{i=1}^{N} \|J_i - F(d_i^{3d})\|^2 \quad (4)$$

wherein $E_{3d}$ represents the error between the human three-dimensional skeleton and the skeleton three-dimensional estimation in the current frame of the video image, that is, the second error; J represents the human three-dimensional skeleton in the current frame, the skeleton has N nodes, N is a positive integer greater than or equal to one; $D^{3d}$ represents the skeleton three-dimensional estimation in the current frame, which accordingly includes the three-dimensional estimation information of N nodes; and wherein $J_i$ represents the preset position information of the i-th node in the human three-dimensional skeleton, $D_i^{3d}$ represents the three-dimensional estimation information of the i-th node in the skeleton three-dimensional estimation, i is a positive integer greater than or equal to one and less than or equal to N; proj represents the process of re-projection, $F(D_i^{3d})$ represents the process of coordinate axis conversion for each node in the three-dimensional skeleton estimation, so that it is in the same coordinate system as the human three-dimensional skeleton, where "$\| \ldots \|$" represents the process of calculating the spatial distance, $w_f$ represents the weight value.

In some embodiments, the weight value wf may be set, for example, based on the calculated spatial distance between the preset skeleton information of each node in the human three-dimensional skeleton and the three-dimensional estimation information of the node in the skeleton three-dimensional estimation. For example, when the spatial distance is less than or equal to the preset threshold, it is set as the first parameter; when the spatial distance is greater than the preset threshold, it is set as the second parameter. The first parameter and the second parameter are intended to characterize the weight value assigned to the error, which can be selected based on actual accuracy requirements, for example, the first parameter is 1, and the second parameter is 0.5. Moreover, the preset threshold may be determined based on the required segmentation accuracy, for example, it may be set to 0.4, or it may also be set to 1 and other values. The embodiments of the present disclosure are not limited by the specific numeric of the first parameter, the second parameter, and the preset threshold.

For example, when the target three-dimensional skeleton of the previous frame of the current frame is used as the human three-dimensional skeleton of the current frame, it may be set as follows: if the spatial distance between the three-dimensional position information of a child node in the current frame and the three-dimensional estimated position information of the node is less than or equal to a preset threshold, the error weight value wf is set as 1; if the spatial distance between the three-dimensional position information of a child node in the current frame and the three-dimensional estimated position information of the node is greater than a preset threshold value, the error weight value is set as 0. According to this, when a node has a significant error in its three-dimensional estimation, that is, its three-dimensional estimation information significantly deviates from the current value of the human three-dimensional skeleton, it can be directly discarded by adjusting its corresponding error weight value wf to avoid its subsequent impact on accuracy of the generated target three-dimensional skeleton.

Based on the above, for each node in the human three-dimensional skeleton, the three-dimensional error of the node is calculated relative to the skeleton three-dimensional estimation of the node, and three-dimensional errors of all nodes are weighted to obtain the second error, so that the second error can comprehensively reflect the difference between the preset position information of the respective node in the human three-dimensional skeleton and the corresponding skeleton three-dimensional estimation information, which is beneficial to subsequent construction of the error function.

Figure 6:
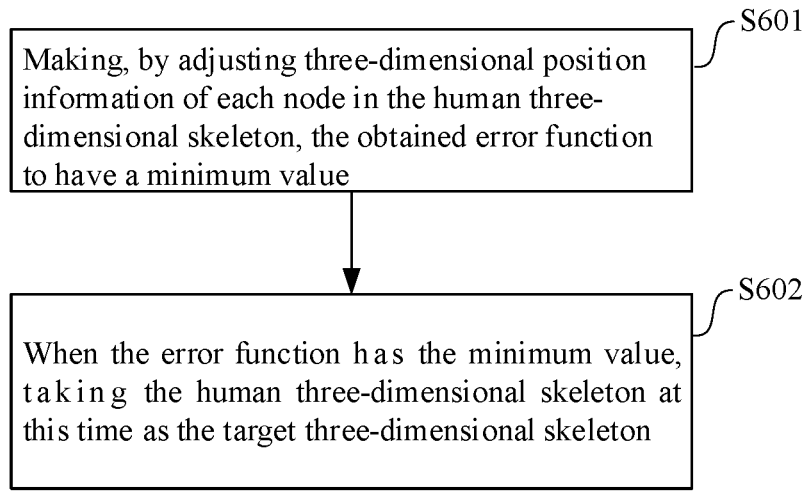
FIG. 6 shows an exemplary flowchart of obtaining the target three-dimensional skeleton based on the preset skeleton value of the human three-dimensional skeleton and the error function according to an embodiment of the present disclosure.

FIG. 6 shows an exemplary flowchart of obtaining the target three-dimensional skeleton based on the preset skeleton value of the human three-dimensional skeleton and the error function skeleton according to an embodiment of the present disclosure.

Referring to FIG. 6, the above process of obtaining the target three-dimensional skeleton may be described in more detail. First, in step S601, by adjusting position information of each node in the human three-dimensional skeleton, the obtained error function is made to have a minimum value.

When the error function is made to take the minimum value, in step S602, when the error function has the minimum value, the human three-dimensional skeleton at this time is taken as the target three-dimensional skeleton.

Based on the above, the minimum value of the error function is obtained by adjusting the preset skeleton value of the human three-dimensional skeleton, that is, adjusting the position information of each node in the human three-dimensional skeleton, and the target three-dimensional skeleton in the current frame is accordingly obtained when the error function has the minimum value, it enables the target three-dimensional skeleton to be obtained on the basis of comprehensively considering the skeleton two-dimensional estimation and the skeleton three-dimensional estimation, so that the target three-dimensional skeleton has high accuracy.

In some embodiments, the process of achieving image segmentation based on the target three-dimensional skeleton can be described in more detail: first, the target three-dimensional skeleton is inputted to an image segmentation algorithm; second, the target three-dimensional skeleton is processed based on the image segmentation algorithm to obtain a skeleton mask and a model mask of the target three-dimensional skeleton; and last, image segmentation is performed on the current frame of the video image based on the skeleton mask and the model mask.

For example, after obtaining the target three-dimensional skeleton, the target three-dimensional skeleton may be inputted to the GrabCut algorithm, processing is performed based on the obtained target human skeleton to obtain its skeleton mask U and model mask V. Further, the obtained skeleton mask and model mask are subjected to morphological processing to obtain an initial input parameter L of the GrabCut algorithm, the initial parameter $L=\{L_b, L_{ub}, L_{uf}, L_f\}$ may be described by the following formula:

$$\begin{cases} L_b = \overline{\text{dilate} \cdot V} \\ L_{ub} = \text{dilate} \cdot V - V \\ L_f = U \cup \text{erode} \cdot V \\ L_{uf} = V - L_f \end{cases} \quad (5)$$

wherein $L_b$ is a set of background pixels, $L_{ub}$ is a set of possible background pixels, $L_{uf}$ is a set of possible foreground pixels, $L_f$ is a set of foreground pixels; and wherein V is the model mask obtained based on the target human skeleton, U is the skeleton mask obtained based on the target human skeleton, "dilate·" indicates a morphological dilatation operation; "erode·" indicates a morphological corrosion operation.

The above formula can be described in more detail. For example, the dilatation operation may be performed on the model mask V, a complement set of the dilated region can be used as the background pixel Lb; a difference between the dilated region of the model mask V and the region before dilatation can be used as the possible background pixel Lub; the corrosion operation is performed on the model mask, a union set of the region included in the skeleton mask U and the region corroded by the model mask V is used as the foreground pixel Lf; the difference between the region contained in the model mask V and the foreground pixel Lf is used as the possible foreground pixel Luf. Based on the above process, the initial parameter L of the GrabCut algorithm is obtained, thereafter, based on the initial parameter L, the GrabCut algorithm can perform image segmentation on the current frame of the video image, and finally, the target portrait is obtained.

Based on the above, by processing the obtained target three-dimensional skeleton and generating the initial parameter for the image segmentation algorithm based on the processing result, it enables to accurately and efficiently implement image segmentation based on the obtained target three-dimensional skeleton. And further, as for the traditional image segmentation algorithm such as GrabCut algorithm, by using the parameter obtained after the target three-dimensional skeleton processing as its initial input, it no longer needs to manually identify the target area box, and can automatically segment the image based on this parameter, the efficiency of image segmentation is improved effectively and the required labor cost and time are reduced.

According to another aspect of the present disclosure, an image segmentation apparatus is also provided.

Figure 7:
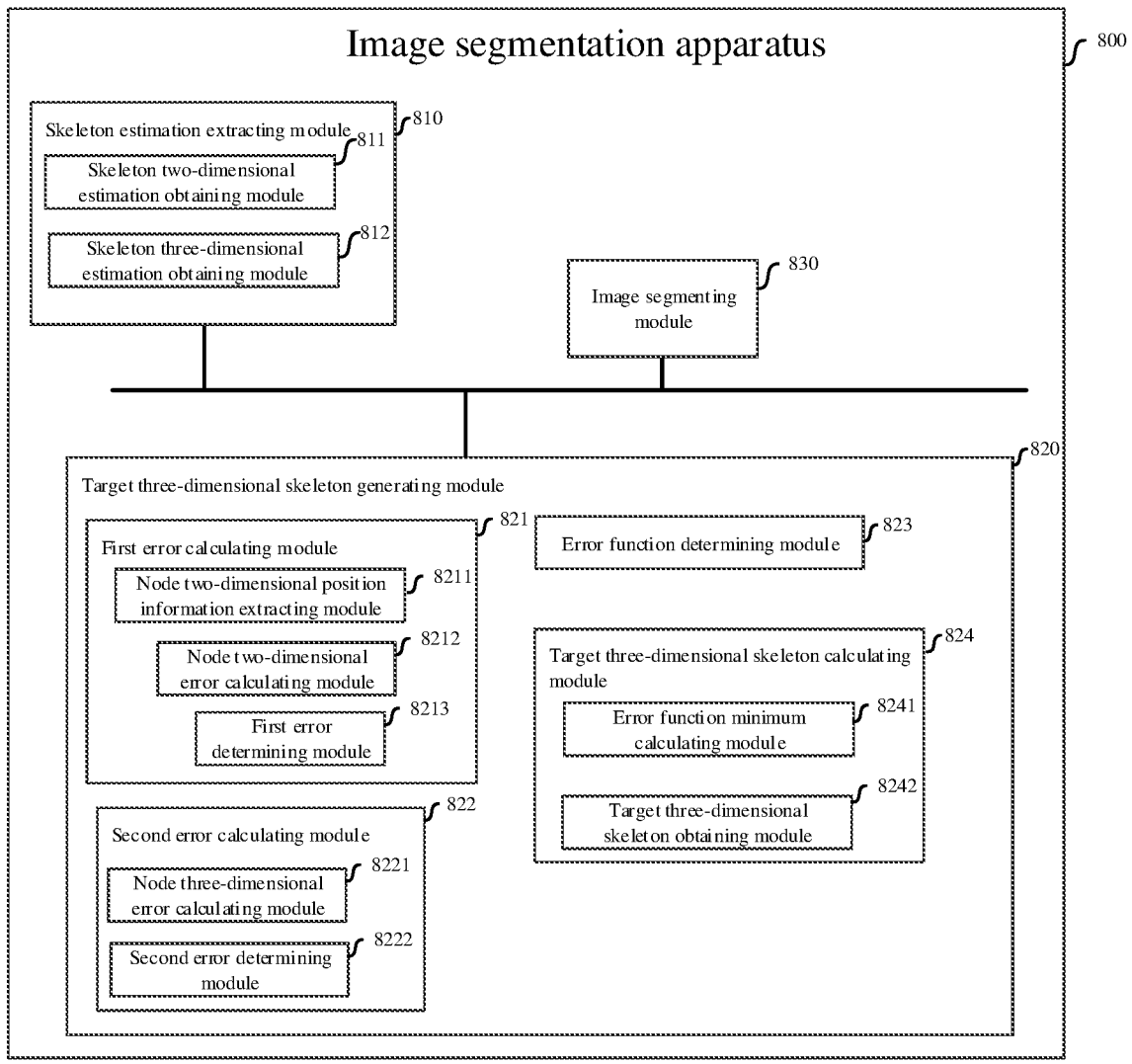
FIG. 7 shows an exemplary block diagram of an image segmentation apparatus according to an embodiment of the present disclosure.

FIG. 7 shows an exemplary block diagram of an image segmentation apparatus according to an embodiment of the present disclosure;

The image segmentation apparatus 800 as shown in FIG. 7 comprises: a skeleton estimation extracting module 810, a target three-dimensional skeleton generating module 820, and an image segmenting module 830.

The skeleton estimation extracting module 810 is configured to extract, from a current frame of a video image, a skeleton two-dimensional estimation and a skeleton three-dimensional estimation of a human three-dimensional skeleton. The target three-dimensional skeleton generating module 820 is configured to obtain a target three-dimensional skeleton based on the skeleton two-dimensional estimation and the skeleton three-dimensional estimation. The image segmenting module 830 is configured to implement image segmentation based on the target three-dimensional skeleton.

The video image may be an image captured in real time through a camera or a video recording device, or may also be a video image obtained in advance in other ways. The embodiments of the present disclosure are not limited by the sources and obtaining methods of the video image. For example, it may be an image directly taken by a road camera, a surveillance camera of an unmanned supermarket, or the like, or it may also be a video image obtained after pre-processing by a computer.

The current frame of the video image is an image frame of the video image to be analyzed at the current time, which may be, for example, an image frame captured in real time at the current time.

The human three-dimensional skeleton refers to a human skeleton model constructed based on human three-dimensional structural features. The human three-dimensional skeleton has multiple nodes. The embodiments of the present disclosure are not limited by the number of the nodes included in the constructed human three-dimensional skeleton and the connection relationships between the respective nodes.

Based on portrait features of the portrait in each frame, the human three-dimensional skeleton may have different spatial position conformations. The human three-dimensional skeleton may have different position values for different frames of the video image, that is, the respective nodes in the human three-dimensional skeleton may have different three-dimensional position information. The present disclosure is not limited by the specific spatial position conformation that the human three-dimensional skeleton has in different video image frames.

In some embodiments, a preset skeleton value of the human three-dimensional skeleton may be set in advance. The human three-dimensional skeleton may have the same preset skeleton value in all frames of the video image, or, the preset skeleton value of the human three-dimensional skeleton may change based on the video frame. The embodiments of the present disclosure are not limited by the specific setting method of the preset skeleton value and the numeric thereof.

Said extracting a skeleton two-dimensional estimation of a human three-dimensional skeleton means that, for the current frame of the video image, a position information estimated value of each node of the human three-dimensional skeleton in the two-dimensional space is obtained based on portrait features in the current frame.

Said extracting a skeleton three-dimensional estimation of a human three-dimensional skeleton means that, for the current frame of the video image, a position information estimated value of each node of the human three-dimensional skeleton in the three-dimensional space is obtained based on portrait features in the current frame.

The target three-dimensional skeleton represents a three-dimensional human skeleton with a specific spatial position conformation and corresponding to features of the portrait in each frame of the video image. The embodiments of the present disclosure are not limited by the specific method of obtaining a target three-dimensional skeleton based on the skeleton two-dimensional estimation and the skeleton three-dimensional estimation.

The process of implementing image segmentation based on the target three-dimensional skeleton, for example, can input the target three-dimensional skeleton to an input end of an image segmentation algorithm, so as to initialize the image segmentation algorithm by using the target three-dimensional skeleton, thereafter, the image segmentation process is performed by the initialized image segmentation algorithm. The present disclosure is not limited by the specific process of implementing image segmentation based on the target three-dimensional skeleton and the selected specific segmentation algorithm.

The video image is a two-dimensional image, that is, an image that does not contain depth information. The two-dimensional image may be directly acquired by a monocular camera, or it may also be a two-dimensional image acquired by other methods. The embodiments of the present disclosure are not limited by the source and obtaining manner of the two-dimensional image.

Based on the above, the image segmentation apparatus described in the present disclosure calculates the target three-dimensional skeleton in the current frame by comprehensively considering skeleton two-dimensional estimation and skeleton three-dimensional estimation of the human three-dimensional skeleton in the current frame, and implements image segmentation based on the target three-dimensional skeleton, enables to improve accuracy and robustness of the obtained target three-dimensional skeleton, thereby accuracy of image segmentation is improved; in addition, the present disclosure implements three-dimensional skeleton construction based on the two-dimensional video image acquired by the monocular camera, the present application has a lower cost of use compared with constructing the three-dimensional skeleton based on the three-dimensional image acquired by a depth camera.

In some embodiments, the skeleton estimation extracting module 810 may further comprise: a skeleton two-dimensional estimation obtaining module 811 and a skeleton three-dimensional estimation obtaining module 812. The skeleton two-dimensional estimation obtaining module 810 can execute the flow shown in FIG. 2A, processing the video image through a first neural network and a second neural network to obtain skeleton two-dimensional estimation and skeleton three-dimensional estimation of the current frame of the video image.

The skeleton two-dimensional estimation includes two-dimensional estimation information of each node in the human three-dimensional skeleton, the skeleton three-dimensional estimation includes three-dimensional estimation information of each node in the human three-dimensional skeleton.

The skeleton two-dimensional estimation obtaining module 811 is configured to execute the operation in step S201 in FIG. 2A, processing the current frame of the video image through a first neural network, obtaining the skeleton two-dimensional estimation of the human three-dimensional skeleton corresponding to a portrait in the current frame.

The first neural network may be selected based on actual needs, and trained based on a preset sample set. The present disclosure is not limited by the type of the selected first neural network and the training manner of the first neural network.

The skeleton three-dimensional estimation obtaining module 812 is configured to perform the operation as shown in step S202 in FIG. 2A, processing a video frame group where the current frame of the video image is located through a second neural network, obtaining the skeleton three-dimensional estimation of the human three-dimensional skeleton based on the portrait in the current frame, wherein the video frame group includes a preset number of consecutive video frames.

The video frame group includes a preset number of consecutive video frames. It aims to provide human motion information in the video image. The embodiments of the present disclosure are not limited by the specific number of video frames included in the video frame group.

The second neural network may be selected based on actual needs, and trained based on a preset sample set. The present disclosure is not limited by the type of the selected second neural network and the training manner of the second neural network.

Based on the above, the second neural network may be the same type or a different type of neural network as the first neural network. The embodiments of the present disclosure are not limited by the types of the first neural network and the second neural network.

Based on the above, the current frame of the video image is processed through the first neural network to obtain the skeleton two-dimensional estimation of the human three-dimensional skeleton in the current frame; and the video frame group is processed through the second neural network to obtain the skeleton three-dimensional estimation of the human three-dimensional skeleton based on the two-dimensional video image, which is beneficial to the subsequent calculation of the target skeleton based on the skeleton two-dimensional estimation and the skeleton three-dimensional estimation. At the same time, the motion information of the portrait in the video image is obtained by processing the consecutive video frames, the skeleton three-dimensional estimation is obtained based on the two-dimensional image, so that the method can be implemented with only a monocular camera, it has a lower application cost.

In some embodiments, the target three-dimensional skeleton generating module 820 further comprises a first error calculating module 821, a second error calculating module 822, an error function determining module 823 and a target three-dimensional skeleton calculating module 824. The target three-dimensional skeleton generating module 820 can execute the flow shown in FIG. 3.

The first error calculating module 821 is configured to execute the operation in step S301, calculating an error between a preset skeleton value of the human three-dimensional skeleton and the skeleton two-dimensional estimation to obtain a first error.

The second error calculating module 822 is configured to execute the operation in step S302 in FIG. 3, calculating an error between a preset skeleton value of the human three-dimensional skeleton and the skeleton three-dimensional estimation to obtain a second error.

For example, a corresponding algorithm may be selected based on actual needs to calculate the first error and the second error. The embodiments of the present disclosure are not limited by the method of calculating the first error and the second error.

For example, the above error calculating process may be performed for each node in the human three-dimensional skeleton; it is also possible to execute with respect to pre-selected preset nodes or preset node groups. The present disclosure is not limited by the number of nodes used for comparison.

The first error and the second error in the present disclosure are only used to distinguish the errors that the human three-dimensional skeleton has with respect to the two-dimensional error estimation and the skeleton three-dimensional estimation, not used to limit the error.

The error function determining module 823 is configured to execute the operation in step S303 in FIG. 3, obtaining an error function based on the first error and the second error.

The process of obtaining an error function based on the first error and the second error can, for example, obtain an error function corresponding to the video frame; for each frame of the video image, or it may also obtain an error function corresponding to the video frame group. The embodiments of the present disclosure are not limited by the specific composition of the obtained error function.

The error function may be, for example, directly adding the comparison results obtained by comparing the human three-dimensional skeleton with the skeleton two-dimensional estimation and the skeleton three-dimensional estimation, or may be obtaining the error function by other manners. The embodiments of the present disclosure are not limited by the specific composition manner of the error function.

The target three-dimensional skeleton calculating module 824 is configured to execute the operation in step S304 in FIG. 3, obtaining the target three-dimensional skeleton based on the preset skeleton value of the human three-dimensional skeleton and the error function.

The process of obtaining the target three-dimensional skeleton can, for example, by adjusting the preset skeleton value of the human three-dimensional skeleton, make the error function to take a minimum value, when the error function obtains the minimum value, the human three-dimensional skeleton at this time is taken as the target three-dimensional skeleton; or the target three-dimensional skeleton may also be obtained in other ways. The embodiments of the present disclosure are not limited by the specific manner in which the target three-dimensional skeleton is obtained based on the preset skeleton value of the human three-dimensional skeleton and the error function.

Based on the above, by calculating the first error existing between the human three-dimensional skeleton and the two-dimensional skeleton estimation, calculating the second error existing between the human three-dimensional skeleton and the skeleton three-dimensional estimation, the error function is constructed based on the first error and the second error, further the target three-dimensional skeleton in the current frame is obtained based on the error function, so that the obtained target three-dimensional skeleton has higher accuracy and robustness, which is beneficial to improve accuracy of the subsequent image segmentation.

In some embodiments, the first error calculating module 821 comprises a node two-dimensional position information extracting module 8211, a node two-dimensional error calculating module 8212, a first error determining module 8213. The first error calculating module 821 can execute the method shown in FIG. 4.

The node two-dimensional position information extracting module 8211 is configured to execute the operation in step S401 in FIG. 4, extracting, for each node of the human three-dimensional skeleton, from predetermined three-dimensional position information of this node, its two-dimensional position information.

The node two-dimensional error calculating module 8212 is configured to execute the operation in step S402 in FIG. 4, calculating an error between the two-dimensional position information and the two-dimensional estimation information of the corresponding node in skeleton two-dimensional estimation to obtain a two-dimensional error value of each node.

The first error determining module 8213 is configured to execute the operation in step S403 in FIG. 4, performing weighted average on two-dimensional error values of respective nodes to obtain the first error.

Based on the above, for each node in the human three-dimensional skeleton, the two-dimensional error of the node is calculated relative to the skeleton two-dimensional estimation of the node, and two-dimensional errors of all nodes are weighted to obtain the first error, so that the first error can comprehensively reflect the difference between the preset position information of the respective node in the human three-dimensional skeleton and the corresponding skeleton two-dimensional estimation information, which is beneficial to subsequent construction of the error function.

In some embodiments, the second error calculating module 822 comprises a node three-dimensional error calculating module 8221 and a second error determining module 8222. The second error calculating module 822 can execute the method shown in FIG. 5.

The node three-dimensional error calculating module 8221 is configured to execute the operation in step S501 in FIG. 5, calculating an error between preset three-dimensional position information and three-dimensional estimation information of the corresponding node in skeleton three-dimensional estimation to obtain a three-dimensional error value of each node.

The second error determining module 8222 is configured to execute the operation in step S502 in FIG. 5, performing weighted average on three-dimensional error values of respective nodes to obtain the second error.

Based on the above, for each node in the human three-dimensional skeleton, the three-dimensional error of the node is calculated relative to the skeleton three-dimensional estimation of the node, and three-dimensional errors of all nodes are weighted to obtain the second error, so that the second error can comprehensively reflect the difference between the preset position information of the respective node in the human three-dimensional skeleton and the corresponding skeleton three-dimensional estimation information, which is beneficial to subsequent construction of the error function.

In some embodiments, the target three-dimensional skeleton calculating module 824 comprises an error function minimum calculating module 8241 and a target three-dimensional skeleton obtaining module 8242. The target three-dimensional skeleton calculating module 824 can execute the method shown in FIG. 6.

The error function minimum calculating module 8241 is configured to execute the operation in step S601 in FIG. 6, making, by adjusting three-dimensional position information of each node in the human three-dimensional skeleton, the obtained error function to have a minimum value.

The target three-dimensional skeleton obtaining module 8241 is configured to execute the operation in step S602 in FIG. 6, taking, when the error function has the minimum value, the human three-dimensional skeleton at this time as the target three-dimensional skeleton.

Based on the above, the minimum value of the error function is obtained and the target three-dimensional skeleton in the current frame is accordingly obtained when the error function has the minimum value, it enables the target three-dimensional skeleton to be obtained on the basis of comprehensively considering the skeleton two-dimensional estimation and the skeleton three-dimensional estimation, so that the target three-dimensional skeleton has high accuracy.

According to another aspect of the present disclosure, there is provided an image segmentation device.

Figure 8:
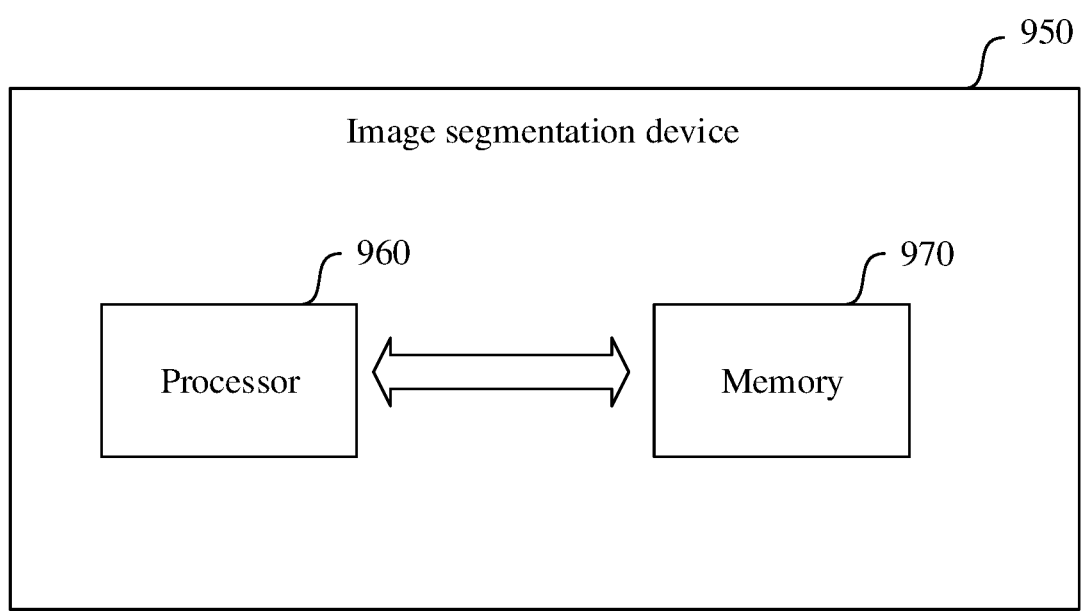
FIG. 8 shows an exemplary block diagram of an image segmentation device according to an embodiment of the present disclosure.

The image segmentation device 950 shown in FIG. 8 may be implemented, for example, as one or more dedicated or general purpose computer system modules or components, such as personal computers, laptops, tablets, mobile phones, personal digital assistance (PDA), smart glasses, smart watches, smart rings, smart helmets and any smart portable devices. The image segmentation device 950 may include at least one processor 960 and a memory 970.

The at least one processor is configured to execute program instructions, the memory 970 may exist in different forms of program storage unit and data storage unit in the image segmentation device 950, such as a hard disk, a read-only memory (ROM), and a random access memory (RAM), it can be used to store various data files used by the processor in processing and/or performing image segmentation, as well as possible program instructions executed by the processor. Although not shown in the figure, the image segmentation device 950 may further comprise an input/output component to support input/output data flow between the image segmentation device 950 and other components (such as a screen display device). The image segmentation device 950 may also send data and information to and receive data and information from a network through a communication port.

In some embodiments, when executed by the processor 960, a set of instructions stored in the memory 970 causes the image segmentation device 950 to perform operations, the operations comprises: extracting, from a current frame of a video image, a skeleton two-dimensional estimation and a skeleton three-dimensional estimation of a human three-dimensional skeleton; obtaining a target three-dimensional skeleton based on the skeleton two-dimensional estimation and the skeleton three-dimensional estimation; implementing image segmentation based on the target three-dimensional skeleton; wherein the human three-dimensional skeleton has multiple nodes, and the video image is a two-dimensional image.

In some embodiments, in order to extract, from a current frame of a video image, a skeleton two-dimensional estimation and a skeleton three-dimensional estimation of a human three-dimensional skeleton, the operation executed by the image segmentation device 950 comprises: processing the current frame of the video image through a first neural network, obtaining the skeleton two-dimensional estimation of the human three-dimensional skeleton based on a portrait in the current frame; processing a video frame group where the current frame of the video image is located through a second neural network, obtaining the skeleton three-dimensional estimation of the human three-dimensional skeleton based on the portrait in the current frame, wherein the video frame group includes a preset number of consecutive video frames; wherein the skeleton two-dimensional estimation includes two-dimensional estimation information of each node in the human three-dimensional skeleton, the skeleton three-dimensional estimation includes three-dimensional estimation information of each node in the human three-dimensional skeleton.

In some embodiments, when obtaining a target three-dimensional skeleton based on the skeleton two-dimensional estimation and the skeleton three-dimensional estimation, the operation executed by the image segmentation device 950 comprises: calculating an error between a preset skeleton value of the human three-dimensional skeleton and the skeleton two-dimensional estimation to obtain a first error; calculating an error between a preset skeleton value of the human three-dimensional skeleton and the skeleton three-dimensional estimation to obtain a second error; obtaining an error function based on the first error and the second error; obtaining the target three-dimensional skeleton based on the preset skeleton value of the human three-dimensional skeleton and the error function.

In some embodiments, when implementing image segmentation based on the three-dimensional skeleton target, the operation executed by the image segmentation device 950 comprises: inputting the target three-dimensional skeleton to an image segmentation algorithm; processing the target three-dimensional skeleton based on the image segmentation algorithm to obtain a skeleton mask and a model mask of the target three-dimensional skeleton; performing image segmentation on the current frame of the video image based on the skeleton mask and the model mask.

In some embodiments, the image segmentation device 950 may receive a video image captured from an image acquisition device external to the image segmentation device 950, and perform the above described image segmentation method on the received image data to realize the functions of the above described image segmentation device.

The video acquisition device may be, for example, a road camera or an automatic monitoring device of an unmanned supermarket.

Although the processor 960 and the memory 970 are presented as separate modules in FIG. 8, a person skilled in the art can understand that the above device modules may be implemented as separate hardware devices, or may also be integrated into one or more hardware devices. The specific implementation of different hardware devices should not be taken as factors for limiting the scope of the present disclosure, as long as the principles of the present disclosure can be implemented.

According to another aspect of the present disclosure, there is also provided a non-volatile computer-readable storage medium having stored thereon computer-readable instructions that, when executed by a computer, perform the method as described above.

Program portions of the technology may be considered to be "product" or "article" that exists in the form of executable codes and/or related data, which are embodied or implemented by a computer-readable medium. A tangible, permanent storage medium may include an internal memory or a storage used by any computers, processors, or similar devices or associated modules. For example, various semiconductor memories, tape drivers, disk drivers, or any similar devices capable of providing storage functionality for software.

All software or parts of it may sometimes communicate over a network, such as the internet or other communication networks. Such communication can load software from one computer device or processor to another. For example, loading from one server or host computer to a hardware environment of one computer environment, or other computer environment implementing the system, or a system having a similar function associated with providing information needed for image retrieval. Therefore, another medium capable of transmitting software elements can also be used as a physical connection between local devices, such as light waves, electric waves, electromagnetic waves, etc., to be propagated through cables, optical cables, or air. Physical medium used for carrying the waves such as cables, wireless connections, or fiber optic cables can also be considered as medium for carrying the software. In usage herein, unless a tangible "storage" medium is defined, other terms referring to a computer or machine "readable medium" mean a medium that participates in execution of any instruction by the processor.

Certain terminology has been used to describe embodiments of the present disclosure. For example, the terms "first/second embodiment", "one embodiment", "an embodiment", and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by a person skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block", "module", "engine", "unit," "module," or "system". Furthermore, aspects of the present disclosure may take the form of a computer program product embodied in one or more computer-readable media having computer-readable program code embodied thereon.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having the meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

What is claimed is:

1. An image segmentation method, comprising:
   extracting, from a current frame of a video image, a skeleton two-dimensional estimation and a skeleton three-dimensional estimation of a human three-dimensional skeleton;
   obtaining a target three-dimensional skeleton based on the skeleton two-dimensional estimation and the skeleton three-dimensional estimation; and
   implementing image segmentation based on the target three-dimensional skeleton,
   wherein the human three-dimensional skeleton has multiple nodes and the video image is a two-dimensional image,
   wherein the extracting, from the current frame of the video image, the skeleton two-dimensional estimation and the skeleton three-dimensional estimation of the human three-dimensional skeleton comprises:
      processing the current frame of the video image through a first neural network, obtaining the skeleton two-dimensional estimation of the human three-dimensional skeleton based on a portrait in the current frame; and
      processing a video frame group where the current frame of the video image is located through a second neural network, obtaining the skeleton three-dimensional estimation of the human three-dimensional skeleton based on the portrait in the current frame, wherein the video frame group includes a preset number of consecutive video frames,
   wherein the skeleton two-dimensional estimation includes two-dimensional estimation information of each node in the human three-dimensional skeleton, and the skeleton three-dimensional estimation includes three-dimensional estimation information of each node in the human three-dimensional skeleton.

2. The image segmentation method according to claim 1, wherein the obtaining the target three-dimensional skeleton based on the skeleton two-dimensional estimation and the skeleton three-dimensional estimation comprises:
   calculating an error between a preset skeleton value of the human three-dimensional skeleton and the skeleton two-dimensional estimation to obtain a first error;
   calculating an error between the preset skeleton value of the human three-dimensional skeleton and the skeleton three-dimensional estimation to obtain a second error;
   obtaining an error function based on the first error and the second error; and
   obtaining the target three-dimensional skeleton based on the preset skeleton value of the human three-dimensional skeleton and the error function.

3. The image segmentation method according to claim 2, wherein the obtaining the target three-dimensional skeleton based on the preset skeleton value of the human three-dimensional skeleton and the error function comprises:
   making, by adjusting three-dimensional position information of each node in the human three-dimensional skeleton, the obtained error function to have a minimum value; and
   when the error function has the minimum value, taking the human three-dimensional skeleton at this time as the target three-dimensional skeleton.

4. The image segmentation method according to claim 2, wherein the calculating the error between the preset skeleton value of the human three-dimensional skeleton and the skeleton two-dimensional estimation to obtain the first error comprises:
   extracting, from each node of the human three-dimensional skeleton, from predetermined three-dimensional position information of each node, its two-dimensional position information;
   calculating an error between the two-dimensional position information and two-dimensional estimation information of a corresponding node in the skeleton two-dimensional estimation to obtain a two-dimensional error value of each node; and
   performing a weighted average on two-dimensional error values of respective nodes to obtain the first error.

5. The image segmentation method according to claim 2, wherein the calculating the error between the preset skeleton value of the human three-dimensional skeleton and the skeleton three-dimensional estimation to obtain the second error comprises:
   calculating an error between preset three-dimensional position information and three-dimensional estimation information of a corresponding node in the skeleton three-dimensional estimation to obtain a three-dimensional error value of each node; and
   performing a weighted average on three-dimensional error values of respective nodes to obtain the second error.

6. The image segmentation method according to claim 1, wherein the implementing the image segmentation based on the target three-dimensional skeleton comprises:
   inputting the target three-dimensional skeleton to an image segmentation algorithm;
   processing the target three-dimensional skeleton based on the image segmentation algorithm to obtain a skeleton mask and a model mask of the target three-dimensional skeleton; and
   performing image segmentation on the current frame of the video image based on the skeleton mask and the model mask.

7. An image segmentation apparatus, comprising:
   a skeleton estimation extracting module configured to extract, from a current frame of a video image, a skeleton two-dimensional estimation and a skeleton three-dimensional estimation of a human three-dimensional skeleton;
   a target three-dimensional skeleton generating module configured to obtain a target three-dimensional skeleton based on the skeleton two-dimensional estimation and the skeleton three-dimensional estimation; and an image segmenting module configured to implement image segmentation based on the target three-dimensional skeleton;

wherein the human three-dimensional skeleton has multiple nodes, and the video image is a two-dimensional image, wherein the skeleton estimation extracting module comprises:

a skeleton two-dimensional estimation obtaining module configured to process the current frame of the video image through a first neural network, obtain the skeleton two-dimensional estimation of the human three-dimensional skeleton corresponding to a portrait in the current frame; and a skeleton three-dimensional estimation obtaining module configured to process a video frame group where the current frame of the video image is located through a second neural network, obtain the skeleton three-dimensional estimation of the human three-dimensional skeleton corresponding to the portrait in the current frame, wherein the video frame group includes a preset number of consecutive video frames, wherein the skeleton two-dimensional estimation includes two-dimensional estimation information of each node in the human three-dimensional skeleton, and the skeleton three-dimensional estimation includes three-dimensional estimation information of each node in the human three-dimensional skeleton.

8. The image segmentation apparatus according to claim 7, wherein the target three-dimensional skeleton generating module comprises:

a first error calculating module configured to calculate an error between a preset skeleton value of the human three-dimensional skeleton and the skeleton two-dimensional estimation to obtain a first error;

a second error calculating module configured to calculate an error between the preset skeleton value of the human three-dimensional skeleton and the skeleton three-dimensional estimation to obtain a second error;

an error function determining module configured to obtain an error function based on the first error and the second error; and a target three-dimensional skeleton calculating module configured to obtain the target three-dimensional skeleton based on the preset skeleton value of the human three-dimensional skeleton and the error function.

9. The image segmentation apparatus according to claim 8, wherein the target three-dimensional skeleton calculating module comprises:

an error function minimum calculating module configured to make, by adjusting three-dimensional position information of each node in the human three-dimensional skeleton, the obtained error function to have a minimum value; and a target three-dimensional skeleton obtaining module configured to take, when the error function has the minimum value, the human three-dimensional skeleton at this time as the target three-dimensional skeleton.

10. The image segmentation apparatus according to claim 8, wherein the first error calculating module comprises:

a node two-dimensional position information extracting module configured to extract, for each node of the human three-dimensional skeleton, from predetermined three-dimensional position information of each node, its two-dimensional position information;

a node two-dimensional error calculating module configured to calculate an error between the two-dimensional position information and two-dimensional estimation information of a corresponding node in the skeleton two-dimensional estimation to obtain a two-dimensional error value of each node; and a first error determining module configured to perform a weighted average on two-dimensional error values of respective nodes to obtain the first error.

11. The image segmentation apparatus according to claim 8, wherein the second error calculating module comprises:

a node three-dimensional error calculating module configured to calculate an error between preset three-dimensional position information and three-dimensional estimation information of a corresponding node in the skeleton three-dimensional estimation to obtain a three-dimensional error value of each node; and a second error determining module configured to perform a weighted average on three-dimensional error values of respective nodes to obtain the second error.

12. An image segmentation device, wherein the image segmentation device includes a processor and a memory, the memory includes a set of instructions that, when executed by the processor, cause the image segmentation device to perform operations comprising:

extracting, from a current frame of a video image, a skeleton two-dimensional estimation and a skeleton three-dimensional estimation of a human three-dimensional skeleton;

obtaining a target three-dimensional skeleton based on the skeleton two-dimensional estimation and the skeleton three-dimensional estimation; and implementing image segmentation based on the target three-dimensional skeleton, wherein the human three-dimensional skeleton has multiple nodes, and the video image is a two-dimensional image, wherein the extracting, from the current frame of the video image, the skeleton two-dimensional estimation and the skeleton three-dimensional estimation of the human three-dimensional skeleton comprises:

processing the current frame of the video image through a first neural network, obtaining the skeleton two-dimensional estimation of the human three-dimensional skeleton based on a portrait in the current frame; and processing a video frame group where the current frame of the video image is located through a second neural network, obtaining the skeleton three-dimensional estimation of the human three-dimensional skeleton based on the portrait in the current frame, wherein the video frame group includes a preset number of consecutive video frames, wherein the skeleton two-dimensional estimation includes two-dimensional estimation information of each node in the human three-dimensional skeleton, and the skeleton three-dimensional estimation includes three-dimensional estimation information of each node in the human three-dimensional skeleton.

13. The image segmentation device according to claim 12, wherein the obtaining the target three-dimensional skeleton based on the skeleton two-dimensional estimation and the skeleton three-dimensional estimation comprises:

calculating an error between a preset skeleton value of the human three-dimensional skeleton and the skeleton two-dimensional estimation to obtain a first error;

calculating an error between the preset skeleton value of the human three-dimensional skeleton and the skeleton three-dimensional estimation to obtain a second error;

obtaining an error function based on the first error and the second error; and obtaining the target three-dimensional skeleton based on the preset skeleton value of the human three-dimensional skeleton and the error function.

14. The image segmentation device according to claim 13, wherein the obtaining the target three-dimensional skeleton based on the preset skeleton value of the human three-dimensional skeleton and the error function comprises:

making, by adjusting three-dimensional position information of each node in the human three-dimensional skeleton, the obtained error function to have a minimum value; and when the error function has the minimum value, taking the human three-dimensional skeleton at this time as the target three-dimensional skeleton.

15. The image segmentation device according to claim 13, wherein the calculating the error between the preset skeleton value of the human three-dimensional skeleton and the skeleton two-dimensional estimation to obtain the first error comprises:

extracting, from each node of the human three-dimensional skeleton, from predetermined three-dimensional position information of each node, its two-dimensional position information;

calculating an error between the two-dimensional position information and two-dimensional estimation information of a corresponding node in the skeleton two-dimensional estimation to obtain a two-dimensional error value of each node; and performing a weighted average on the two-dimensional error value of respective nodes to obtain the first error.

16. The image segmentation device according to claim 13, wherein the calculating the error between the preset skeleton value of the human three-dimensional skeleton and the skeleton three-dimensional estimation to obtain the second error comprises:

calculating an error between preset three-dimensional position information and three-dimensional estimation information of a corresponding node in the skeleton three-dimensional estimation to obtain a three-dimensional error value of each node; and performing a weighted average on the three-dimensional error value of respective nodes to obtain the second error.

17. The image segmentation device according to claim 12, wherein the implementing the image segmentation based on the target three-dimensional skeleton comprises:

inputting the target three-dimensional skeleton to an image segmentation algorithm;

processing the target three-dimensional skeleton based on the image segmentation algorithm to obtain a skeleton mask and a model mask of the target three-dimensional skeleton; and performing image segmentation on the current frame of the video image based on the skeleton mask and the model mask.

* * * * *